US009578298B2

(12) United States Patent
Ballocca et al.

(10) Patent No.: US 9,578,298 B2
(45) Date of Patent: Feb. 21, 2017

(54) METHOD FOR DECODING 2D-COMPATIBLE STEREOSCOPIC VIDEO FLOWS

(75) Inventors: Giovanni Ballocca, Turin (IT); Paolo D'Amato, Rome (IT); Saverio Celia, Rivalta di Torino (IT)

(73) Assignee: S.I.SV.EL SOCIETA' ITALIANA PER LO SVILUPPO DELL'ELETTRONICA S.P.A., None (TO) (IT)

( * ) Notice: Subject to any disclaimer, the term of this patent is extended or adjusted under 35 U.S.C. 154(b) by 419 days.

(21) Appl. No.: 13/704,217

(22) PCT Filed: Jun. 27, 2011

(86) PCT No.: PCT/IB2011/052810
§ 371 (c)(1),
(2), (4) Date: Dec. 13, 2012

(87) PCT Pub. No.: WO2012/001606
PCT Pub. Date: Jan. 5, 2012

(65) Prior Publication Data
US 2013/0083160 A1 Apr. 4, 2013

(30) Foreign Application Priority Data
Jun. 28, 2010 (IT) .............. TO2010A0549

(51) Int. Cl.
*H04N 13/00* (2006.01)
*H04N 13/04* (2006.01)
(Continued)

(52) U.S. Cl.
CPC ...... *H04N 13/0007* (2013.01); *H04N 13/0048* (2013.01); *H04N 13/0066* (2013.01);
(Continued)

(58) Field of Classification Search
None
See application file for complete search history.

(56) References Cited

U.S. PATENT DOCUMENTS 6,552,723 B1 * 4/2003 Duluk, Jr. ............... G06T 1/60
345/419
2002/0048395 A1 4/2002 Harman et al.
(Continued)

FOREIGN PATENT DOCUMENTS

EP 1 524 859 A2 4/2005
JP 2004-240469 8/2004
(Continued)

OTHER PUBLICATIONS

International Search Report dated Nov. 17, 2011, issued in PCT Application No. PCT/IB2011/052810, filed Jun. 27, 2011.
(Continued)

*Primary Examiner* — Heather Jones
(74) *Attorney, Agent, or Firm* — Workman Nydegger

(57) ABSTRACT

A method for processing a video stream of digital images includes: receiving the video stream which includes at least one composite frame containing a pair of stereoscopic digital images according to a predetermined packing format; receiving metadata which describes the format of the composite frame; generating an output video stream which can be reproduced on a visualization device, wherein the method further includes the steps of determining the area in the composite frame which is occupied by one image of the stereoscopic pair within the composite frame based on the metadata; extracting the image contained in the area from the composite frame, and generating an output frame containing the extracted image.

19 Claims, 2 Drawing Sheets

(51) Int. Cl.
*H04N 21/235* (2011.01)
*H04N 21/435* (2011.01)
*H04N 19/597* (2014.01)
*H04N 19/172* (2014.01)
*H04N 19/132* (2014.01)
*H04N 19/44* (2014.01)

(52) U.S. Cl.
CPC ....... *H04N 13/0454* (2013.01); *H04N 19/132* (2014.11); *H04N 19/172* (2014.11); *H04N 19/44* (2014.11); *H04N 19/597* (2014.11); *H04N 21/235* (2013.01); *H04N 21/435* (2013.01)

(56) References Cited

U.S. PATENT DOCUMENTS

| | | | |
|---|---|---|---|
| 2004/0101043 A1 | 5/2004 | Flack et al. | |
| 2008/0303893 A1* | 12/2008 | Kim | H04N 13/0022 348/42 |
| 2010/0026783 A1 | 2/2010 | Chiu et al. | |
| 2010/0245548 A1* | 9/2010 | Sasaki et al. | 348/51 |
| 2011/0234753 A1 | 9/2011 | Caramelli et al. | |
| 2012/0105583 A1* | 5/2012 | Suh | H04N 13/0048 348/43 |

FOREIGN PATENT DOCUMENTS

| | | |
|---|---|---|
| JP | 2005-124200 | 5/2005 |
| JP | 2010-508752 | 3/2010 |
| WO | 2007/064159 A1 | 6/2007 |
| WO | 2008/054100 A1 | 5/2008 |
| WO | 2008/127676 A2 | 10/2008 |
| WO | 2009/077929 A1 | 6/2009 |
| WO | 2010/046739 A1 | 4/2010 |

OTHER PUBLICATIONS

Written Opinion dated Nov. 17, 2011, issued in PCT Application No. PCT/IB2011/052810, filed Jun. 27, 2011.
European Office Action dated Jan. 6, 2015, issued in EP Application No. 11744071.9.
Japanese Office Action dated Aug. 25, 2015, issued in Japanese Application No. JP 2013-517623, filed May 16, 2013.

\* cited by examiner

METHOD FOR DECODING 2D-COMPATIBLE STEREOSCOPIC VIDEO FLOWS

BACKGROUND OF THE INVENTION

1. Field of the Invention

The present invention relates to a method for decoding a stereoscopic digital video stream, i.e. a video stream which, when appropriately processed in a visualization device, produces sequences of images which are perceived as being three-dimensional by a viewer.

This method allows a user of a conventional (i.e. non-stereoscopic) decoder and/or television set to view stereoscopic images in 2D mode, as well as to use a stereoscopic (3D) decoder and/or television set for 2D display.

2. Present State of the Art

In recent years, the cinematographic production world has paid much attention and has devoted huge resources to the production of stereoscopic 3D contents under the stimulus of new production tools made available by the new digital technologies.

The interest in 3D is now extending to domestic use, i.e. for displaying images on a television set. For example, some pay-TV operators will shortly broadcast 3D programs.

The most common approach to presenting stereoscopic video contents involves displaying two independent video streams intended for the right eye and for the left eye, respectively, which are then reassembled by the human brain into a three-dimensional object.

Stereoscopic contents for domestic use are generally high-definition video contents and may be distributed on a mass memory medium (DVD or Blu-ray discs, magneto-optic or solid-state media, etc.) or via (wired or wireless) broadcasting channels or via a telecommunication network (IP).

In the production environment, however, with the existing structures it may be impossible to transfer and handle separately the two streams produced by stereoscopic video cameras shooting a scene from two different points of view.

Moreover, the distribution networks reaching the final user are so big that it is uneconomical to use two independent high-definition streams for providing a single service. As a consequence, a number of measures must be taken during the production process in order to reduce the bit-rate required for content transfer and fruition.

Since the results of studies carried out on the differences in the perception of details in two-dimensional and three-dimensions images seem to indicate that the quality perceived by the user remains acceptable even when the resolution of stereoscopic contents is lowered compared to that of two-dimensional contents, different techniques have been developed for packing the two images composing the stereoscopic view into a single frame (frame packing).

For example, in the case of a single high-definition frame C (1920×1080 pixels), the two images composing the left and right channels (hereafter referred to as L and R) are acquired with a horizontal resolution equal to half the resolution of a high-definition frame and are then arranged side by side into a single frame (side-by-side format), as shown in FIG. 1a.

In this way, it is possible to use a single high-definition stream for transporting the two independent video channels; at decoding time, the two half-frames are then separated and brought back to the 16/9 format by applying suitable interpolation techniques.

Likewise, an alternative process may be used which involves halving the vertical resolution and leaving the horizontal resolution unchanged, and then arranging the two frames L and R one on top of the other (top-bottom format), as shown in FIG. 1b.

The stereoscopic video stream consisting of composite frames is then compressed in order to reduce its transport bit-rate before distributing it on a broadcasting network, an IP network or a mass memory medium.

One of the most important requirements on which the attention of the various service providers (especially public service broadcasters) is focused is the 2D compatibility of the stereoscopic signals.

In fact, in order to allow those users who already own a high-definition decoder to enjoy the broadcast services, it is desirable that 3D programs can also be displayed as 2D programs. Likewise, it is desirable that a 3D content on a DVD, a Blu-ray disc 3D or an Internet site can be displayed by both 2D and 3D television sets and monitors.

This result can be achieved in two ways: either by simultaneously broadcasting both the 2D and 3D versions of one program or by adopting an appropriate technique for coding the stereoscopic stream.

Of course, the first option involves wasting bandwidth, which is one thing that service providers would rather avoid.

As to the second option, several techniques are known in the art for generating 2D compatible stereoscopic streams.

One of these technique relates to the application of so-called "depth maps", as described, for example, in US patent applications no. US 2002/0048395 and no. US 2004/0101043.

In practice, a signal is associated with the two-dimensional colour video in the form of a supplementary black and white video that carries the depth maps. A suitable decoder can rebuild a stereoscopic video starting from the received data. However, this technique suffers from the very same problems of the aforementioned 2D and 3D transmission of the same program: in fact, two video signals must be transferred in parallel, resulting in a high transport bit-rate.

Another 2D-compatible stereoscopic stream coding technique is, for example, the one referred to as "multiview".

Because the pairs of right and left images making up the stereoscopic video stream are characterized by a high degree of resemblance, the space-time redundancy suppression techniques employed when coding two-dimensional streams can be used in this case as well. In fact, once a certain offset due to the geometric distance between the shooting points (i.e. the interocular distance) has been subtracted, the differences between the right image and the left image are small.

The MPEG2 standard has been extended with a supplementary specification called Multi View Profile (MVP); likewise, the subsequent H.264/AVC standard has been extended by including the Multi View Coding (MVC) specification.

A common characteristic of these two specifications is the use of scalable video coding: the stereoscopic video stream is compressed into a base layer (the 2D base stream) plus an enhancement layer, which transports the second view. The syntax of the coded stream ensures that the 2D video can also be decoded by old-generation decoders, so long as they comply with the MPEG2 or H.264/AVC standards.

However, the bit-rate necessary for coding stereoscopic streams into one of the above described formats is still too high to allow it to be used in the broadcasting environment and, as a consequence, frame packing formats remain the only feasible short-term solution for starting up 3D services.

SUMMARY OF THE INVENTION

The object of the present invention is therefore to provide a decoding method that allows extracting a 2D-compatible (2D) video signal from a stereoscopic digital video stream and, in particular, a method for decoding a 2D-compatible stereoscopic digital video stream based on the use of composite frames which is applicable whatever the method employed for packing the right and left images within said composite frames.

This and other objects of the present invention are achieved through a method for decoding a stereoscopic video stream incorporating the features set out in the appended claims, which are intended as an integral part of the present description.

Further objects and advantages of the present invention will become more apparent from the following description of a few embodiments thereof, which are supplied by way of non-limiting example.

BRIEF DESCRIPTION OF THE DRAWINGS

Said embodiments will be described with reference to the annexed drawings, wherein.

DETAILED DESCRIPTION OF THE PREFERRED EMBODIMENTS

Figure 1A:
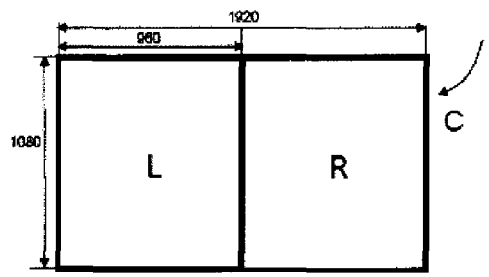
FIGS. 1a, 1b and 1c, already referred to above, show a composite frame of a stereoscopic video stream, respectively in the side-by-side format, in the top-bottom format and in an alternative format.
Figure 3:
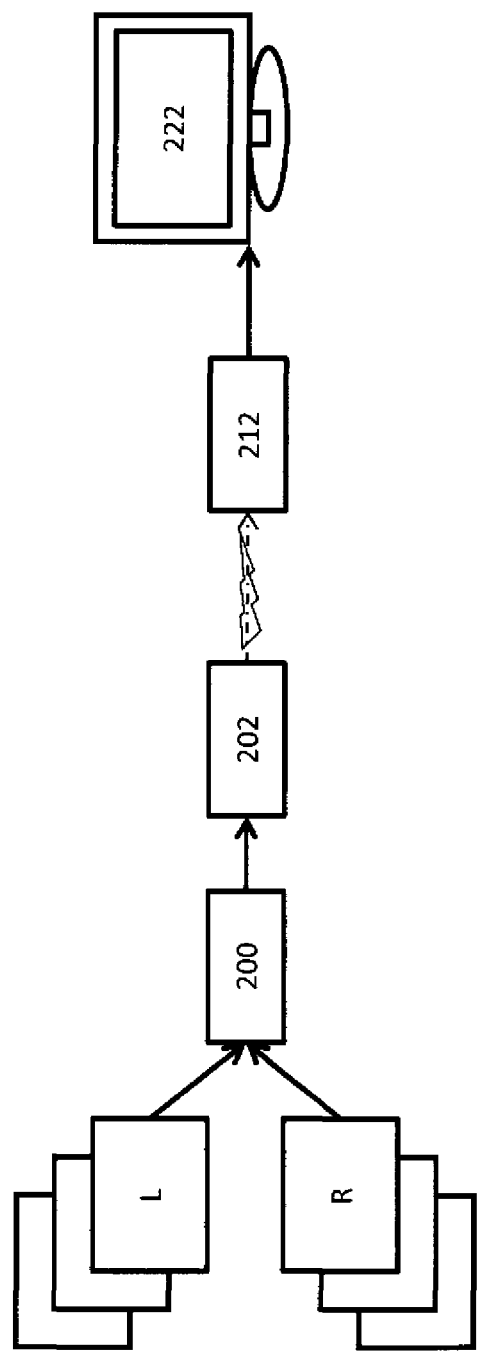
FIG. 3 shows a system for producing and displaying a video stream of images, which comprises a decoder and a video playback device according to the invention.

Referring now to FIG. 3, there is shown a system for producing and displaying a video stream of images, which comprises a stereoplexer 200 (a device for producing a composite frame, also referred to as stereoplexing) configured to receive pairs of right and left stereoscopic images designated by the letters L and R, respectively. In the video stream to be distributed, the stereoscopic images of one pair are combined into a single composite frame FC in accordance with a specific packing format. In this embodiment, the images are combined by using the packing format previously described with reference to FIG. 1a.

The output signal of the stereoplexer 200 may be compressed by an encoder 202 and possibly multiplexed with other compressed signals and then broadcast on broadcasting networks, or it may be distributed as a file via a telecommunication network or on a storage medium. It should be noted that the stereoplexer 200 may be a separate device or may be incorporated into the encoder 202.

The processing steps that follow the production of the composite frame FC are carried out by using known apparatuses and methods, which are not within the scope of the invention and will not therefore be described any further herein.

It must be pointed out that during the stereoplexing, compression or multiplexing step it is a common practice to insert suitable signalling metadata into the resulting data stream, so as to describe the frame packing method used for coding the stereoscopic stream. Such metadata may be entered, for example, into the SEI (Supplemental Enhancement Information) messages of the H.264 coding or into the Service Information that describes the composition of the transport stream into which the video content has been multiplexed. Alternatively, the metadata may be entered into the very composite frame FC, in accordance with the method described in patent application IT2008MO000267. Actually, said metadata may be entered in any form or mode (e.g. it may be entered as XML descriptors, or as suitable binary data structures, or as codes derived from a look-up table known to the decoding device); also, it may be transported as in-band or off-band signalling, and may be associated with the video stream at any point of the content production and distribution chain. These modes are not a part of the invention and will not therefore be discussed any further herein.

In order to reproduce the video stream, a decoder 212 can determine, based on the frame packing format description transported in the above-described metadata, the region occupied by one of the two stereoscopic images (shown in FIGS. 2a, 2b and 2c), and then cuts that region to send it to the 2D visualization apparatus.

This determination may be obtained either explicitly or implicitly starting from the metadata.

In explicit mode, the geometry of the frame packing format is exhaustively described in the metadata (e.g. by expressly stating the coordinates of the vertices of the areas occupied by each stereoscopic image).

In implicit mode, instead, only the frame packing type (e.g. side-by-side) is stated in the metadata, said indication being sufficient for the decoder to determine such areas.

In a first embodiment, the stereoscopic signal coded, compressed and broadcast, or read from a storage medium, arrives at a digital decoder 212 which can be connected to a visualization apparatus 222 (e.g. a conventional television set).

The decoder 212 is equipped with suitable software components which allow it to acquire and analyze the signalling that describes the stereoscopic signal. For example, these software components may be installed either during the manufacturing stage or subsequently through an update process that may take place in different ways: for example, by receiving a new firmware version over the air, by downloading it via a telecommunication network, or by reading it from a peripheral connected via a USB interface. Said software components also comprise the implementation of algorithms necessary for obtaining one of the two images that make up the stereoscopic video depending on the frame packing format in use.

Figure 2A:
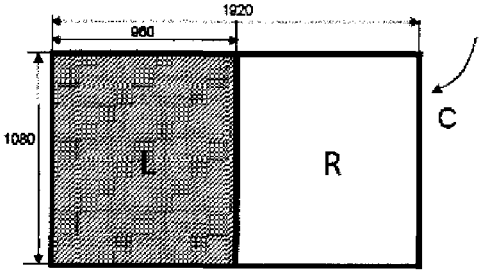
FIGS. 2a, 2b and 2c show the composite frames of FIGS. 1a, 1b and 1c, respectively, in which a frame region has been appropriately highlighted to illustrate a specific step of the method according to the present invention.
Figure 1B:
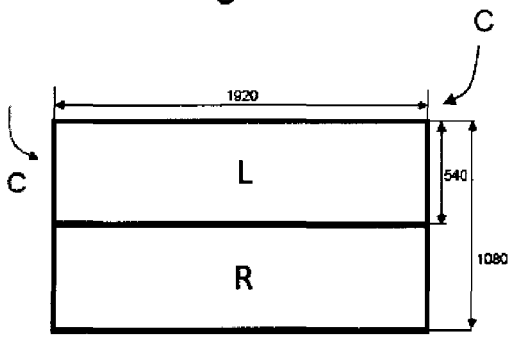
Figure 2B:
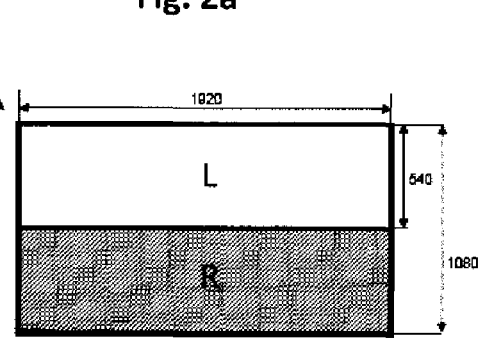
Figure 2C:
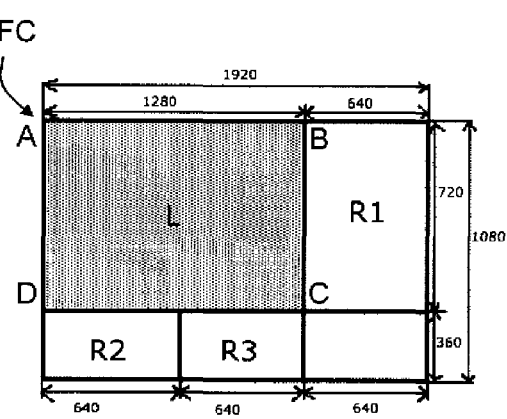

For example, when using the implicit mode and the side-by-side format (FIG. 1a), the method according to the invention determines the area occupied by one of the stereoscopic images by dividing the frame into two parts having the same area along the vertical axis of the frame itself (FIG. 2a). On the contrary, in the case of the top-bottom format (FIG. 1b) the frame is divided along the horizontal axis (FIG. 2b).

One of the parts into which the frame has been subdivided is selected as a two dimensional image and is then displayed after having been suitably processed (resized).

Figure 1C:
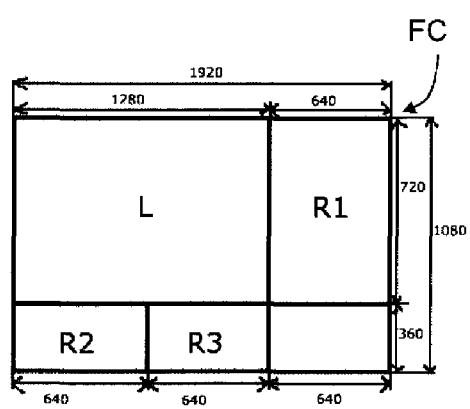

If the signalling contains an explicit description of the frame packing format (e.g. the format of FIG. 1c), then the decoder 212 will select the information necessary for cutting one of the two component images from the frames of the stereoscopic video stream. For instance, the signalling may indicate the coordinates of the vertices of the polygons that enclose one of the images that make up the stereoscopic pair (e.g. the points A, B, C, D of FIG. 2c): in this case, the decoder 212 should only select the data pertaining to one of the two images and apply the cutting algorithm corresponding to the frame packing format in use.

The subsequent resizing of the selected section can be delegated to the scaler of the decoder 212 or, with equivalent results, to the one of the display device 222. This component applies suitable interpolation algorithms in order to bring the image back to its selected display format, thus rebuilding the missing pixels or modifying the form factor used for pixel representation.

In one alternative embodiment, the decoder 212 is integrated into the display device 222.

It should be noted that those parts of the composite frame which are not contained in the 2D display window (i.e. the white parts in FIGS. 2a,b,c) are not used by the visualization apparatus and, in principle, may even not be decoded. Therefore, if the decoder reads the packing format information, it may even abstain from decoding those parts of the composite frame which are not used for 2D visualization. For example, a decoder which cannot process 50 or 60 Hz 1080p frames, but only 1080i frames, may be able to decode the 720p image representative of one of the two views entered into the 1080p frame of FIG. 1c.

In a further embodiment of the invention, the above-described method can be applied by a decoder 212 or a 3D visualization apparatus in the event that the user decides to temporarily switch from 3D display to 2D display (e.g. because his/her eyes have grown tired due to stereoscopic vision). In such a situation, the spectator can switch between 3D and 2D display by issuing an appropriate command (e.g. by pressing a specific remote control button).

In conclusion, the method and the decoder according to the invention ensure 2D compatibility for three-dimensional video streams towards conventional 2D visualization apparatuses and 3D visualization apparatuses.

The decoder 212 may be any device capable of receiving and decoding a stereoscopic video stream in accordance with the invention, e.g. a digital television receiver, a reader of optical or magnetic digital media (DVD, Blu-ray player, personal video recorder). The decoder 212 may also be built in an apparatus that comprises the display device.

The present invention is not limited to a method for 2D-compatible decoding of a stereoscopic video stream and to the related devices, but may be subject to many modifications, improvements or replacements of equivalent parts and elements without departing from the inventive idea, as clearly specified in the following claims.

The invention claimed is:

1. A method for processing a video stream of digital images, the method comprising the steps of:
   receiving the video stream which comprises at least one composite frame (FC), each composite frame containing a pair of stereoscopic digital images (L,R) according to a predetermined frame packing format;
   generating an output video stream which can be reproduced on a visualization apparatus,
   receiving metadata which determine an area occupied by one of the two images within said composite frame (FC), said metadata indicating either a geometry of the frame packing format or a frame packing type of said composite frame (FC);
   determining the area in the composite frame (FC) which is occupied by said one image of the stereoscopic pair within the composite frame based on said metadata;
   decoding only that part of the composite frame (FC) which contains said one image to be displayed, and generating an output frame containing said decoded image.

2. The method according to claim 1, wherein in the said composite frame (FC) said one image of said pair of stereoscopic digital images (L,R) is undivided.

3. The method according to claim 1, wherein said metadata determines coordinates that describe an area occupied by said one image of said composite frame.

4. The method according to claim 1, wherein the metadata is positioned in the SEI messages of the H.264 standard.

5. The method according to claim 1, wherein the metadata is positioned in the Service Information of the transport stream.

6. The method according to claim 1, wherein the metadata is positioned within the composite frame (FC).

7. A method according to claim 1, wherein said metadata determines coordinates of vertices of an area occupied by one image of the pair of stereoscopic digital images contained in the composite frame.

8. A method according to claim 1, wherein said metadata determines coordinates of vertices of a polygon that encloses one image of the pair of stereoscopic digital images contained in the composite frame.

9. A method according to claim 1, wherein said metadata determines coordinates of vertices of a plurality of polygons that enclose one image of the pair of stereoscopic digital images contained in the composite frame.

10. A method according to claim 1, wherein said metadata determines coordinates of vertices of a plurality of areas occupied by one image of the pair of stereoscopic digital images contained in the composite frame.

11. A video processing device for processing video streams of digital images, comprising:
    a receiver configured to receive a video stream which comprises at least one composite frame (FC), each composite frame containing a pair of stereoscopic digital images (L,R) according to a predetermined frame packing format;
    a scaler configured to generate an output video stream which can be reproduced on a visualization apparatus,
    a decoder configured to read metadata which determine an area occupied by one of the two images within said composite frame (FC), wherein said metadata indicate either a geometry of the frame packing format or a frame packing type of said composite frame (FC);
    said decoder configured to determine the area in the composite frame (FC) which is occupied by said one image of the stereoscopic pair within the composite frame based on said metadata, and decode only that part of the composite frame (FC) which contains the one image to be displayed, wherein
    the scaler is configured to generate an output frame containing said decoded image.

12. The video processing device according to claim 11, wherein said metadata determines coordinates that describe an area occupied by said one image of said composite frame.

13. The video processing device according to claim 11, wherein the decoding method is activated upon the user's command.

14. The video processing device according to claim 13, wherein the decoding method is activated by the user by pressing a specific remote control button.

15. A method according to claim 11, wherein said metadata determines coordinates of vertices of an area occupied by one image of the pair of stereoscopic digital images contained in the composite frame.

16. A method according to claim 11, wherein said metadata determines coordinates of vertices of a polygon that encloses one image of the pair of stereoscopic digital images contained in the composite frame.

17. A method according to claim 11, wherein said metadata determines coordinates of vertices of a plurality of polygons that enclose one image of the pair of stereoscopic digital images contained in the composite frame.

18. method according to claim 11, wherein said metadata determines coordinates of vertices of a plurality of areas occupied by one image of the pair of stereoscopic digital images contained in the composite frame.

19. A video playback device comprising a video processing device according to claim 11.

* * * * *

UNITED STATES PATENT AND TRADEMARK OFFICE
CERTIFICATE OF CORRECTION

PATENT NO. : 9,578,298 B2  
APPLICATION NO. : 13/704217  
DATED : February 21, 2017  
INVENTOR(S) : Ballocca et al.

Page 1 of 1

It is certified that error appears in the above-identified patent and that said Letters Patent is hereby corrected as shown below:

In the Claims

Column 6  
Line 17, change "A method" to -- The method --  
Line 21, change "A method" to -- The method --  
Line 25, change "A method" to -- The method --  
Line 29, change "A method" to -- The method --  
Line 64, change "A method according to claim 11" to -- The video processing device according to claim 11 --

Column 7  
Line 1, change "A method according to claim 11" to -- The video processing device according to claim 11 --  
Line 5, change "A method according to claim 11" to -- The video processing device according to claim 11 --  
Line 9, change "method according to claim 11" to -- The video processing device according to claim 11 --

Signed and Sealed this  
Twenty-ninth Day of August, 2017

Joseph Matal  
*Performing the Functions and Duties of the*  
*Under Secretary of Commerce for Intellectual Property and*  
*Director of the United States Patent and Trademark Office*